United States Patent
Kouris (10) Patent No.: US 10,648,446 B2
(45) Date of Patent: May 12, 2020

(54) ASSEMBLY FOR GENERATING ELECTRICITY

(71) Applicant: Paul Steven Kouris, Victoria (AU)

(72) Inventor: Paul Steven Kouris, Victoria (AU)

(*) Notice: Subject to any disclaimer, the term of this patent is extended or adjusted under 35 U.S.C. 154(b) by 727 days.

(21) Appl. No.: 14/910,250

(22) PCT Filed: Aug. 4, 2014

(86) PCT No.: PCT/AU2014/000779
§ 371 (c)(1),
(2) Date: Feb. 4, 2016

(87) PCT Pub. No.: WO2015/017881
PCT Pub. Date: Feb. 12, 2015

(65) Prior Publication Data
US 2016/0177911 A1    Jun. 23, 2016

(30) Foreign Application Priority Data

Aug. 5, 2013    (AU) ................................. 2013902924

(51) Int. Cl.
*F03B 7/00* (2006.01)
*F03B 13/10* (2006.01)
(Continued)

(52) U.S. Cl.
CPC ................ *F03B 13/10* (2013.01); *F03B 3/02* (2013.01); *F03B 11/02* (2013.01); *H02K 7/1823* (2013.01);
(Continued)

(58) Field of Classification Search
CPC .. F03B 13/00; F03B 13/10; F03B 3/02; F03B 7/00; F03B 11/02; Y02E 10/223; F05B 2240/132
See application file for complete search history.

(56) References Cited

U.S. PATENT DOCUMENTS 1,504,776 A * 8/1924 Nagler .................... F03B 11/00
290/52
4,076,448 A * 2/1978 Sanders, Jr. .............. F03B 3/00
415/184
(Continued)

FOREIGN PATENT DOCUMENTS

AU          199897298           5/2000
DE          4314820           11/1994
(Continued)

OTHER PUBLICATIONS

KCT Domestic Pilot Demonstration—Aug. 21, 2010 <URL: http://www.youtube.com/watch?v:dPIWSVhVHL0> Published on Sep. 20, 2010.
(Continued)

*Primary Examiner* — Richard A Edgar
*Assistant Examiner* — Maxime M Adjagbe
(74) *Attorney, Agent, or Firm* — Michael Best & Friedrich LLP (57) ABSTRACT

An assembly for generating electricity from flowing water includes a chamber having a base, a side wall extending from the base, a water inlet, and a water outlet, a rotor unit having a shaft and a rotor mounted to the shaft located in and rotatable in the chamber in response to water flow through the chamber, and an electrical generator coupled to the rotor unit for generating electricity in response to rotation of the rotor. The dimensions of the inlet, the outlet and the chamber and the positions of the inlet, the outlet and the rotor are selected to promote the formation of a vortex within the chamber when in use the assembly is located in a body of water or beside a body of water, in a waterway or beside a waterway, within an enclosed water conduit or beside an enclosed water conduit, and there is a flow of water through the chamber from the inlet to the outlet.

16 Claims, 7 Drawing Sheets

(51) Int. Cl.
*F03B 3/02* (2006.01)
*F03B 11/02* (2006.01)
*H02K 7/18* (2006.01)

(52) U.S. Cl.
CPC ....... *F05B 2240/132* (2013.01); *Y02E 10/223* (2013.01); *Y02E 10/226* (2013.01); *Y02E 60/17* (2013.01)

(56) References Cited

U.S. PATENT DOCUMENTS

| | | | | |
|---|---|---|---|---|
| 4,182,123 | A * | 1/1980 | Ueda | F03B 13/086 137/123 |
| 4,948,985 | A * | 8/1990 | Adams | F03B 1/00 290/54 |
| 5,921,745 | A | 7/1999 | Round et al. | |
| 6,929,444 | B1 * | 8/2005 | Bomski | F01D 1/32 415/80ke |
| 8,164,209 | B2 * | 4/2012 | Rovinsky | F03B 13/10 290/52 |
| 2012/0274070 | A1 * | 11/2012 | Payre | F03B 13/06 290/52 |

FOREIGN PATENT DOCUMENTS

| | | |
|---|---|---|
| FR | 2813643 | 3/2002 |
| WO | 2011051421 | 5/2011 |

OTHER PUBLICATIONS

KCT Purchaser and Investor Presentation—The Kouris Centri Turbine Generator <URL:http://www.kourispower.com/wp-content/uploads/pip.pdf> published on Apr. 5, 2012.
International Search Report for PCT/AU2014/000779 dated Sep. 8, 2014 (3 pages).
International Preliminary Report on Patentability for PCT/AU2014/000779 dated Nov. 9, 2015 (22 pages).

* cited by examiner

ASSEMBLY FOR GENERATING ELECTRICITY

FIELD OF THE INVENTION

The present invention relates to an assembly for generating electricity.

DESCRIPTION OF THE PRIOR ART

International publication WO00/23708 in the name of the applicant discloses an invention of a water-driven assembly for generating electricity. The assembly takes advantage of energy of water flowing in a vortex, with the energy being the result of a combination of factors including the Coriolis force from the rotation of the Earth. This energy, which can be described as rotational kinetic energy, is different to energy generated by the fall of water.

The applicant has carried out substantial research and development work in relation to the invention and part of this work has focused on developing an assembly that can be manufactured and transported and installed effectively and efficiently in or beside a wide range of bodies of water and can operate for long periods of time with minimal maintenance.

SUMMARY OF INVENTION

The present invention, which is described by the applicant as the KCT Mark 2 invention, provides an assembly for generating electricity that is adapted to be positioned in a body of water or beside a body of water and includes a chamber having a base, a side wall extending from the base, a water inlet, and a water outlet, a rotor unit having a shaft and a rotor mounted to the shaft located in and rotatable in the chamber in response to water flow through the chamber, and an electrical generator coupled to the rotor unit for generating electricity in response to rotation of the rotor. The dimensions of the inlet, the outlet and the chamber and the positions of the inlet, the outlet and the rotor are selected to promote the formation of a vortex within the chamber when in use the assembly is located in a body of water or beside a body of water and there is a flow of water through the chamber from the inlet to the outlet.

The body of water may be any one or more than one of a lake, dam, river, stream, creek, canal, and any other water way.

The assembly is straightforward to manufacture, transport and install. The chamber and the other components of the assembly can be made from any suitable materials. The assembly is an uncomplicated design that is robust and reliable and requires low maintenance. The assembly is adapted to be a free-standing unit within a body of water or beside a body of water, in a waterway or beside a waterway, within an enclosed water conduit or beside an enclosed water conduit. The assembly may be any suitable size depending on a range of factors including but not limited to the body of water in which the assembly is to be located or placed beside and the electrical power requirements for the assembly. One, although not the only feature of the assembly, which is linked in part to the way in which the assembly is powered by water flow, is that a number of the assemblies can be positioned in a waterway or beside a waterway, such as a river or a canal, along the length of a section of the waterway and/or across a width of the waterway with minimum impact on the flow of water along the waterway. Therefore, a single relatively small unit that can be manufactured at a manufacturing site and then transported without significant issues from the manufacturing site to an end use location can be used in small scale operations, and a plurality of the same size assemblies can be used for larger-scale operations without creating issues for water flow in the waterway.

The dimensions of the inlet, the outlet and the chamber and the positions of the inlet, the outlet and the rotor may be selected to promote the formation of a vortex within the chamber that is in the form of multiple spirals of water down the height of the chamber between the inlet and the outlet.

There does not need to be a substantial flow rate of water in the body of water for the assembly to be able to generate electricity. The invention relies on the formation of a vortex within the chamber. Vortex formation requires water flow through the chamber and a chamber structure that promotes the formation of the vortex. When the vortex is formed, the energy that can be extracted from the vortex movement is related to the mass of water moving in the vortex in the chamber and not simply to the flow rate of water into and from the chamber.

The assembly can operate effectively across the spectrum of flow rates of water in the body of water from substantially no flow to high flow rates.

In a start-up phase of the assembly, with the chamber initially empty and control valves for the inlet and the outlet selectively opened so that the water level in the chamber builds up to a point where a vortex forms in the chamber. The vortex is indicated by a conical air space within the chamber that extends downwardly to the outlet, with the water in the chamber flowing in one or multiple spirals of water down the height of the chamber between the inlet and the outlet. Once there is a stable vortex in the chamber, the control valves are adjusted as required.

The side wall may have a cylindrical internal surface to promote the formation of the vortex in the chamber.

The chamber may include formations, such as vanes and/or baffles, to promote the formation of the vortex in the chamber. The formations may be supported by or be part of the side wall and/or the base.

The assembly may include a structure that is adapted to support and locate the assembly in the body of water or on the ground or in the ground beside the body of water.

The support structure may include a plurality of members such as legs that, in use of the assembly, extend downwardly from the base and are adapted to locate the assembly on the bed of the body of water or on the ground or in the ground beside the body of water.

The support structure may include a framework that is adapted to support other components of the assembly.

The framework may be formed to cradle the base and the side wall of the chamber.

The framework may include a plurality of members beneath the base of the chamber to support the chamber.

The rotor unit may be positioned so that the shaft is located centrally in the chamber.

The rotor may include a plurality of vanes extending radially outwardly from the shaft towards the side wall.

The vanes may be curved vanes. The vanes may be any other suitable profile.

Each vane may sweep rearwardly from an inner edge that is connected to the shaft and an outer edge.

The vanes may be concave when viewed in a direction of water flow within the chamber.

The inlet may include a flow control valve to control the flow of water into the chamber via the inlet.

The inlet may be in the side wall.

The inlet may be in an upper section of the side wall.

The inlet and the vanes may be positioned relative to each other so that, in use, at least a part of the water flowing into the chamber from the inlet flows directly towards the vanes.

The inlet may be formed to promote the formation of the vortex in the chamber when water flows into the chamber via the inlet.

The inlet may be formed to supply water into the chamber so that the water flows in a spiral pathway within the chamber around the central shaft and downwardly to the outlet in the base of the chamber The inlet may be formed to supply water into the chamber at an inward angle of 5-10°.

The inlet may be formed to supply water into the chamber at an inward angle of 7°.

The inlet may include an inlet pipe for supplying water into the chamber.

The inlet pipe may have a straight section.

The inlet may include an inlet funnel to maximise the flow of water into the chamber from the waterway or body of water and the flow of water drawn into the chamber by the vortex.

The assembly may include a plurality of inlets.

The plurality of inlets may be at the same height of the chamber and spaced around the perimeter of the chamber.

The plurality of inlets may be at a number of different heights of the chamber.

The outlet may include a flow control valve to control the flow of water from the outlet.

The outlet may be in the base.

The outlet may be positioned in a central part of the base.

The outlet may include an outlet funnel positioned within the chamber.

The shape and size of the outlet funnel may be selected to promote the formation of the vortex within the chamber. In particular, the outlet funnel may be a shallow funnel, typically having an angle of less than 20°, typically 5-15°, to a horizontal axis when the assembly is in an upright position in order to form the vortex as a stable vortex that does not move around within the chamber after it has been established.

The outlet may include an outlet pipe that extends from the chamber.

The outlet pipe may include a first section that extends downwardly from the base and a second section that extends perpendicular to the first section.

The inlet and the outlet may describe an angle of 135-180° when viewed from above the assembly.

The outlet pipe may be formed so that water flow through the outlet and the outlet pipe minimises disruption to the vortex in the chamber.

By way of example, the outlet pipe may include a rifled internal surface, i.e. a surface with a series of spiral ridges in the internal surface.

The transverse cross-sectional area of the outlet may be greater than the transverse cross-sectional area of the inlet. This is an important feature when the assembly is used in waterways having sufficiently high flow rates that in effect contribute a load to the system that results in a pumping action of water from the chamber via the outlet. In a pilot plant operation of the applicant located in a waterway that was a fast flowing waterway at different times, the pilot plant assembly had a 300 mm diameter inlet and a 400 mm diameter outlet to avoid overflow situations in the chamber at high water flow rate times. In addition, the pilot plant operation found that when the assembly was placed under electrical load, this also results in a pumping action of water from the chamber via the outlet, thereby increasing the outflow.

The chamber may have a maximum width of less than 30 meters. In a situation in which the side wall has a cylindrical inner surface, the maximum width is the diameter of the chamber.

The maximum width of the chamber may be 25 meters.

The maximum width of the chamber may be 20 meters.

The maximum width of the chamber may be 15 meters.

The maximum width of the chamber may be 10 meters.

The maximum width of the chamber may be 5 meters.

The maximum width of the chamber may be greater than 0.5 meters.

The maximum width of the chamber may be greater than 0.1 meters.

The maximum width of the chamber may be greater than 0.01 meters.

The chamber may have a maximum height of 10 meters.

The chamber may have a maximum height of 5 meters.

The chamber may have a maximum height of 1 meter.

The assembly may include a gear box coupled to the rotor unit and the electrical generator to tune the output of the rotor unit to requirements of the electrical generator. The purpose of the gearbox is to make it possible to maximise the output of the rotor unit to the electrical generator.

The assembly may include a control system to take into account variations of flow conditions within the chamber.

The control system may be operatively connected to the inlet and/or the outlet flow control valves to control the valve or valves.

The present invention also provides an electricity generation system that includes the above-described assembly located in a body of water, with the assembly partially or completely submerged in water, and with water flowing through the chamber and forming a vortex that drives the rotor and the generator and produces electricity.

The inlet and the outlet may be submerged in water, with water flowing through the chamber from the inlet to the outlet and forming the vortex that drives the rotor and the generator and produces electricity.

The assembly may be located in the body of water with the side wall of the chamber extending above the level of water in the waterway.

The assembly may be located in the body of water as a free-standing unit.

The assembly may be located in the body of water supported on the support structure of the assembly.

The present invention also provides an electricity generation system that includes the above-described assembly located on the ground or in the ground beside a body of water, with the inlet and the outlet in fluid communication with the body of water, and with water flowing through the chamber from the inlet to the outlet and forming a vortex that drives the rotor and the generator and produces electricity.

The electricity generation system may be adapted to generate 1-300 kW of electricity from the assembly.

The electricity generation system may be adapted to generate 0.1-100 kW of electricity from the assembly.

The electricity generation system may be adapted to generate 0.1-30 kW of electricity from the assembly.

The electricity generation system may be adapted to generate 0.001-0.1 kW of electricity from the assembly.

The electricity generation system may include a plurality of the assemblies located in the body of water as separate assemblies or coupled together, with each assembly generating electricity.

In a situation where the body of water is a waterway, such as a river or a stream or a creek, the assemblies may be located along the length of a section of the waterway or across the width of the waterway.

The electrical generation system may be may be adapted to be coupled to a local or wider electricity supply network.

The present invention also provides a method of generating electricity that includes locating the above-described assembly in a body of water with the assembly partially or completely submerged in water so that water flows through the chamber forms a vortex that drives the rotor and the generator and produces electricity.

The inlet and the outlet may be submerged in water, with water flowing through the chamber from the inlet to the outlet and forming the vortex that drives the rotor and the generator and produces electricity.

The present invention also provides a method of generating electricity that includes locating the above-described assembly on the ground or in the ground beside a body of water with the inlet and the outlet in fluid communication with the body of water so that water flows through the chamber from the inlet to the outlet and forms a vortex that drives the rotor and the generator and produces electricity.

BRIEF DESCRIPTION OF THE DRAWINGS

The invention is described further by way of example only with reference to the accompany drawings, of which.

DESCRIPTION OF AN EMBODIMENT

The embodiment of the electricity generation assembly 3 shown in the Figures is one of a number of possible embodiments of the invention. This particular embodiment is adapted to be positioned in a body of water or beside a body of water as a free-standing unit. The following description of the embodiment focuses on positioning the assembly in a body of water. Other embodiments of the invention are also adapted to be positioned in a body of water as a free-standing unit and further embodiments of the invention are adapted to be positioned beside a body of water.

With reference to the Figures, the assembly 3 includes a chamber 5 having a base 7, a cylindrical side wall 13 (having a cylindrical internal surface) extending upwardly from the base 7, an inlet 15 in the side wall 13, an outlet 17 in the base 7, a rotor unit having a shaft 19 and a rotor 21 mounted to the shaft 19 and located in and rotatable within the chamber 5 in response to water flow through the chamber 5, and an electrical generator 25 coupled to the rotor unit for generating electricity in response to rotation of the rotor unit.

The assembly 3 is open to the atmosphere.

The assembly 3 may also include a gear box (not shown) coupled to the rotor unit and the electrical generator 25 to tune the output of the rotor unit to requirements of the electrical generator. The gear box may be any suitable gear box.

Figure 14:
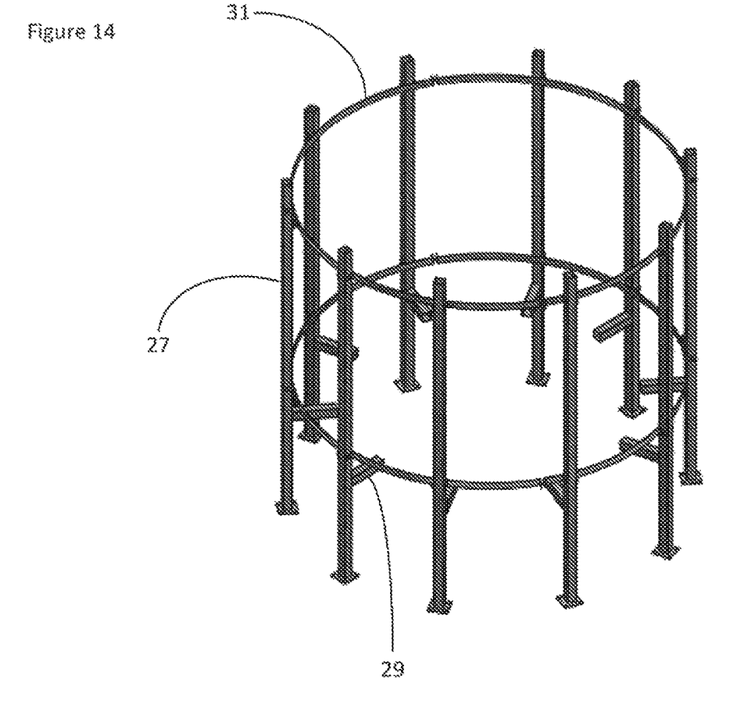
FIG. 14 is a perspective view of the support structure of the assembly.

The assembly 3 also includes a structure that supports the components of the assembly and is adapted to locate the assembly in a body of water. The support structure is formed to define a cradle for the chamber 5 that supports the chamber 5 and the other assembly components in a stable way. With reference to FIG. 14, the support structure is a steel framework that includes a plurality of upright posts 27 arranged in a circle and interconnected by upper and lower steel rings 31. The support structure also includes a series of brackets 29 that extend inwardly from the posts 27 and define a series of supports for the base 7 of the chamber 5. The lower sections of the posts 27 define support members in the form of legs for locating the assembly on the bed of a body of water.

The support structure also includes a platform 11 that supports the generator 25 and the rotor unit. The platform 11 is a steel framework that is supported by opposed pairs of posts 27 and extends across the chamber 5. More particularly, the rotor unit is suspended from the platform 11 with the rotor shaft 19 in the centre of the chamber 5 and the rotor 21 in a lower section of the chamber 5 and clear of the base 7 of the chamber 5.

The chamber 5 is formed from a plastics material. The chamber may be formed from any other suitable material.

Figure 1:
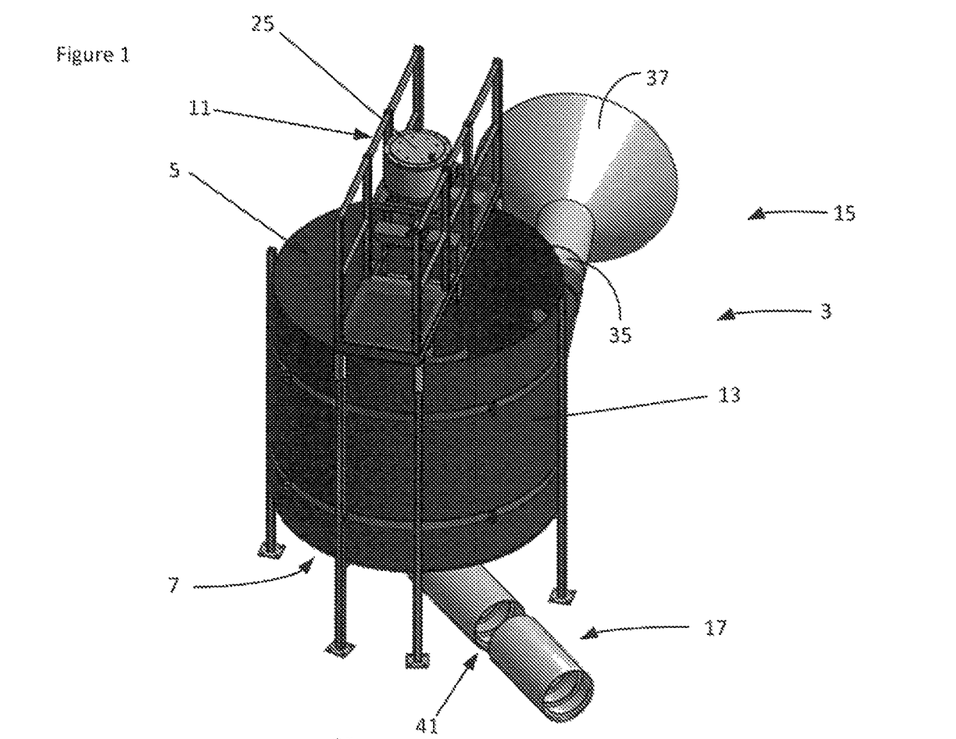
FIG. 1 is a perspective view of one, although not the only, embodiment of an electricity generation assembly in accordance with the present invention.
Figure 2:
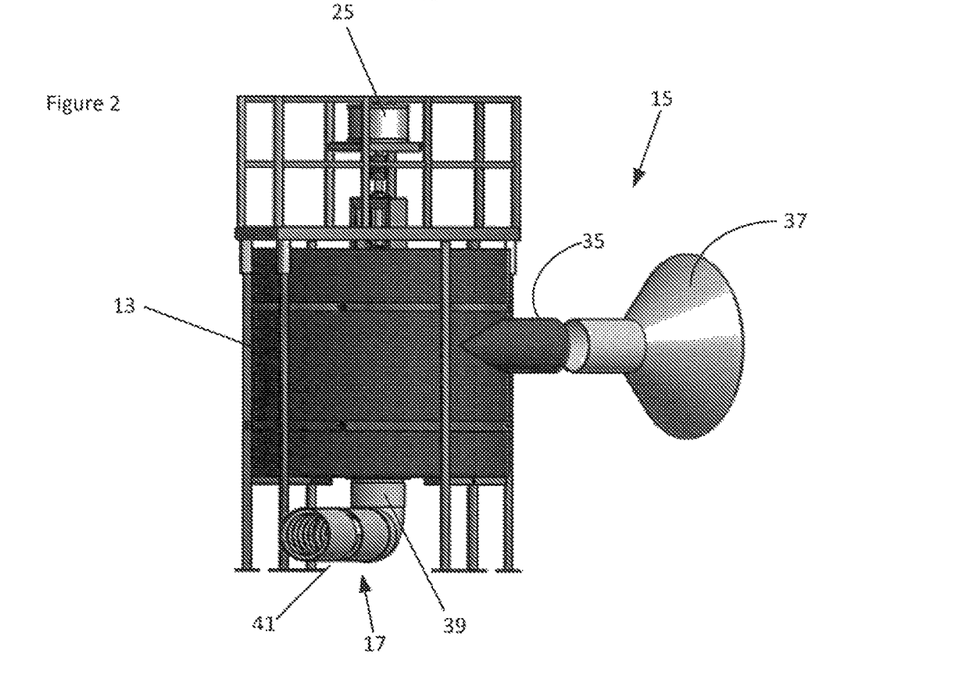
FIG. 2 is a side view of the assembly.
Figure 3:
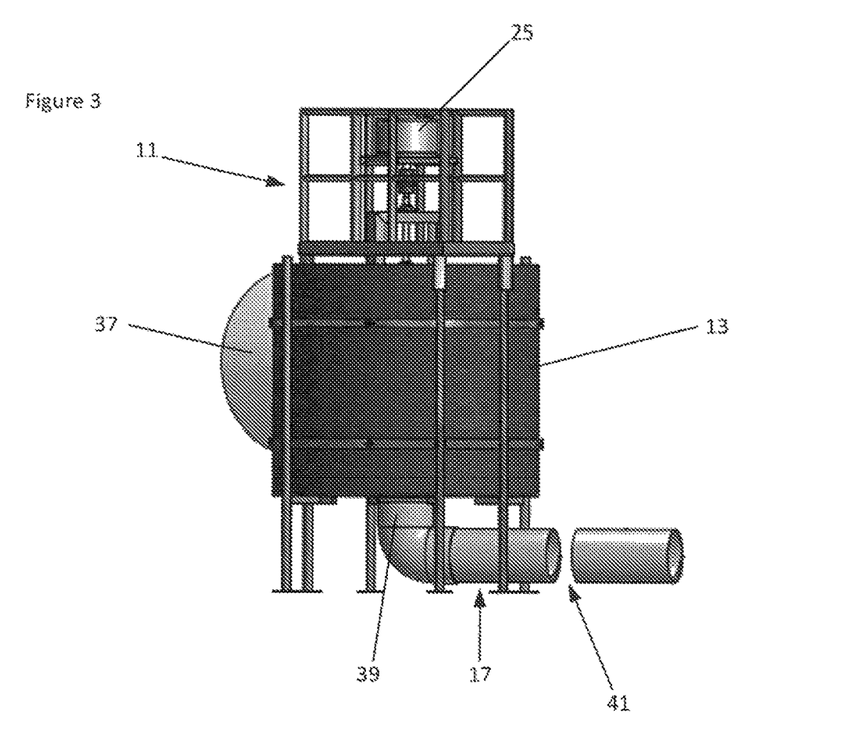
FIG. 3 is a side view of the assembly from a different direction to that of FIG. 2.
Figure 4:
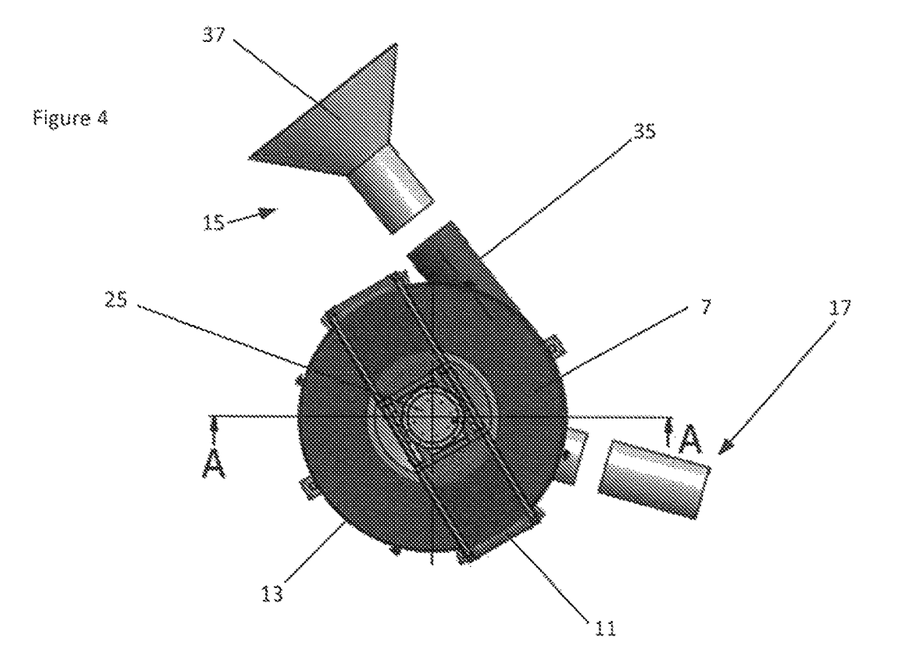
FIG. 4 is a top view of the assembly.

The rotor 21 includes a plurality of vanes 33 that extend radially outwardly from the shaft 19 towards the side wall 13. The vanes 33 are curved vanes that sweep rearwardly from an inner edge that is connected to the shaft 19 and an outer edge. The vanes 33 are concave when viewed in a direction of water flow within the chamber 5 (a clockwise direction as viewed in FIG. 1).

The inlet 15 is in an upper section of the side wall 13. The inlet 15 is formed to promote the formation of a vortex in the chamber 5 when water flows into the chamber 5 via the inlet 15. In particular, the inlet 15 is formed to supply water into the chamber 5 to promote water flow in a vortex, i.e. a spiral pathway within the chamber 5 around the rotor shaft 19 and downwardly to the outlet 17 in the base 7 of the chamber 5. Movement of water in this pathway, preferably with multiple spirals of water down the height of the chamber 5 between the inlet 15 and the outlet 17, results in the water contacting and moving the rotors 21 and therefore powers the generator 25 and produces electricity. Vortex formation makes it possible to extract rotational kinetic energy that is the result of a combination of factors including the Coriolis force from the rotation of the Earth. As noted above, the energy that can be extracted from the vortex movement is related to the mass of water moving in the vortex in the chamber 5 and not simply to the flow rate of water into and from the chamber 5.

The inlet 15 includes a flow control valve (not shown) to control the flow of water into the chamber 5 via the inlet 15.

Figure 7:
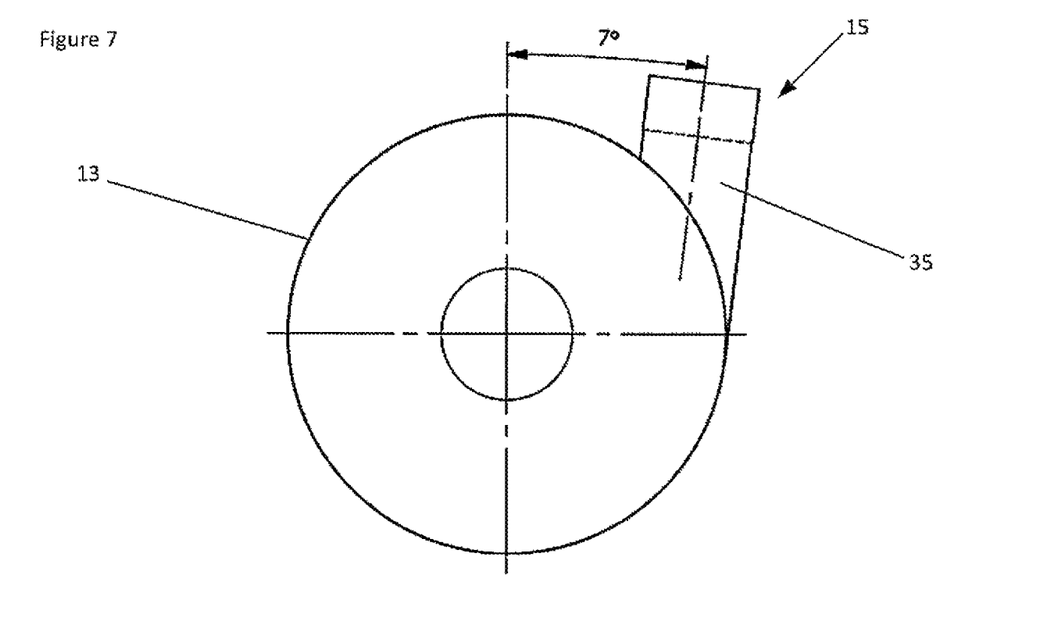
FIG. 7 is a top view of the chamber/inlet shown in FIG. 6.
Figure 8:
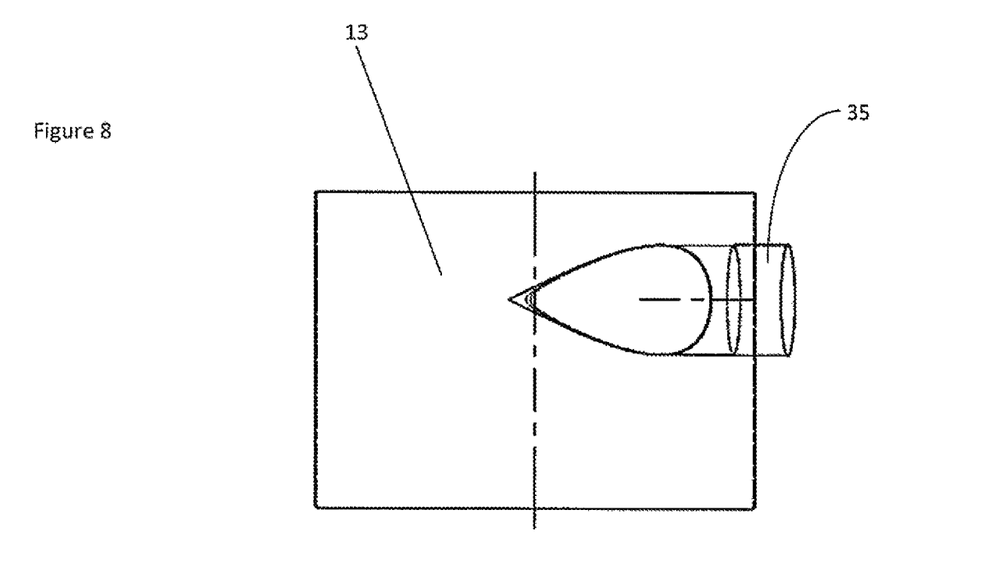
FIG. 8 is a side view of the chamber/inlet shown in FIG. 6.
Figure 9:
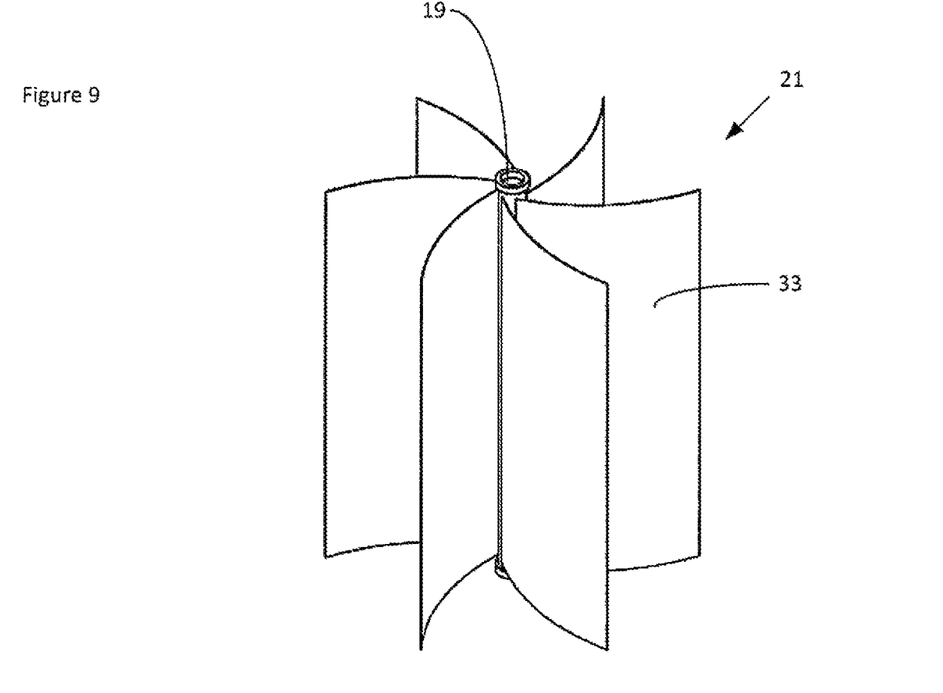
FIG. 9 is a perspective view of the rotor of the assembly.
Figure 10:
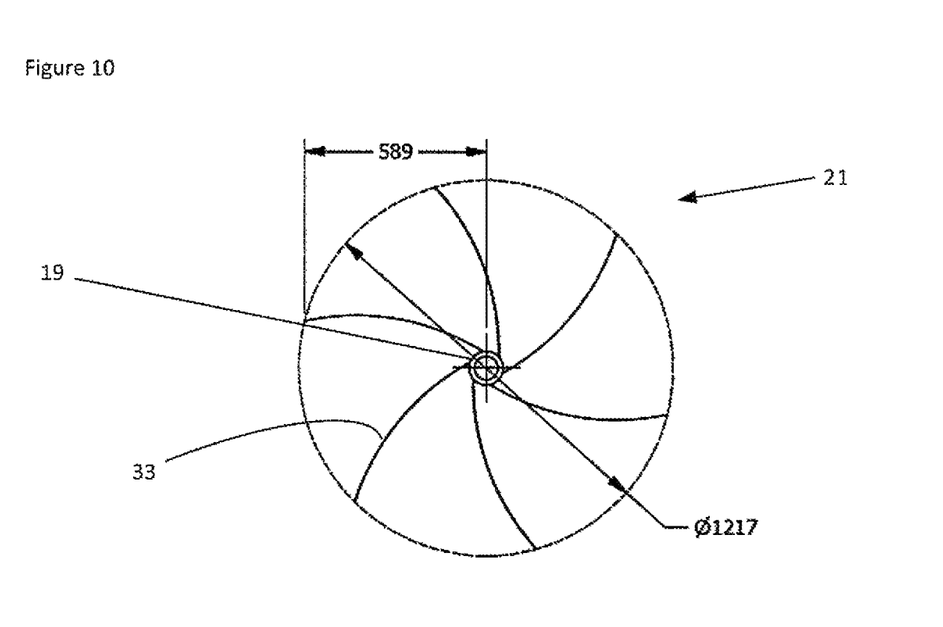
FIG. 10 is a top view of the rotor shown in FIG. 9.
Figure 11:
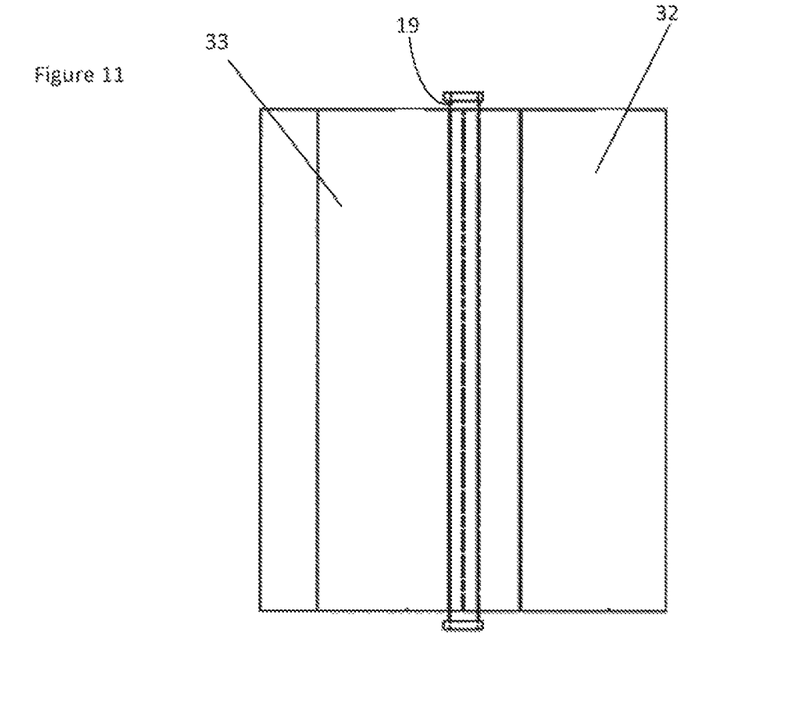
FIG. 11 is a side view of the rotor shown in FIG. 9.

The inlet 15 includes a pipe that has a straight section 35 and a funnel section 37. The purpose of the funnel section 37 is to draw as much water as possible (within the overall assembly design) into the chamber 5. A high water flow rate within the chamber 5 is one factor in moving from essentially linear flow within the chamber 5 (such as in a water-wheel) to the formation of a vortex with the chamber 5. The straight section 35 facilitates directing the flow of water into the chamber as described above, i.e. to promote water flow in a spiral pathway, preferably with multiple spirals of water down the height of the chamber 5 between the inlet 15 and the outlet 17. In order to further facilitate achieving a desired flow of water within the chamber 5, the pipe 35 is positioned at an inward angle of 7°, as can be seen in FIG. 7.

Figure 5:
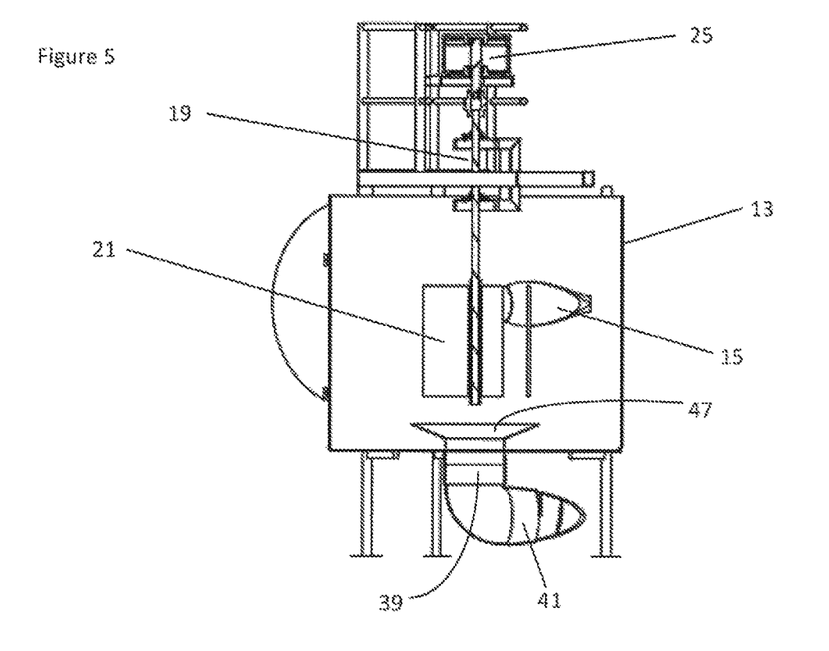
FIG. 5 is a cross section along the line A-A in FIG. 4.
Figure 6:
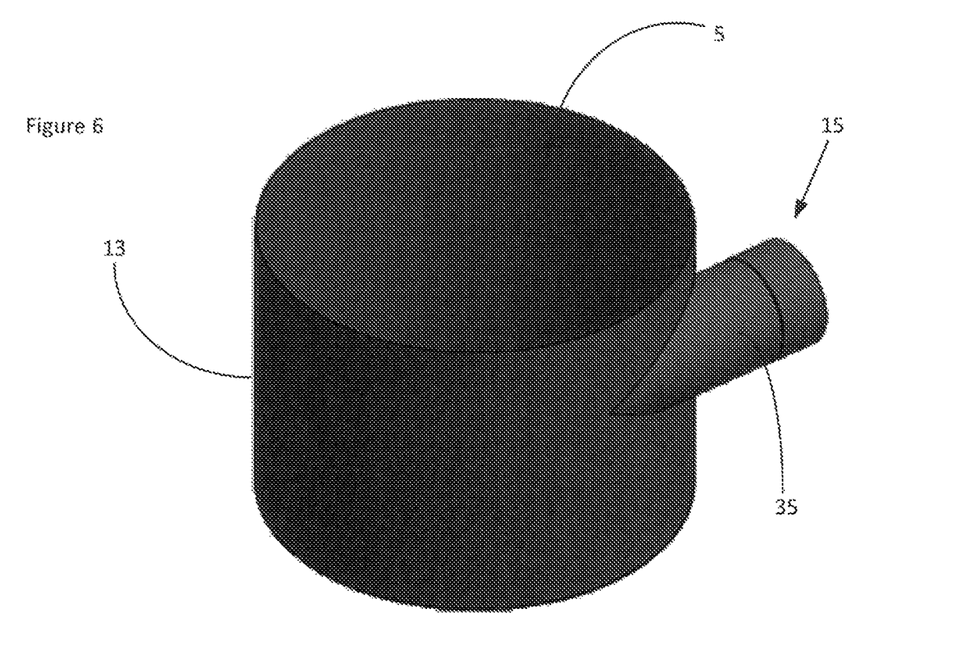
FIG. 6 is a perspective view of the chamber and inlet of the assembly.
Figure 12:
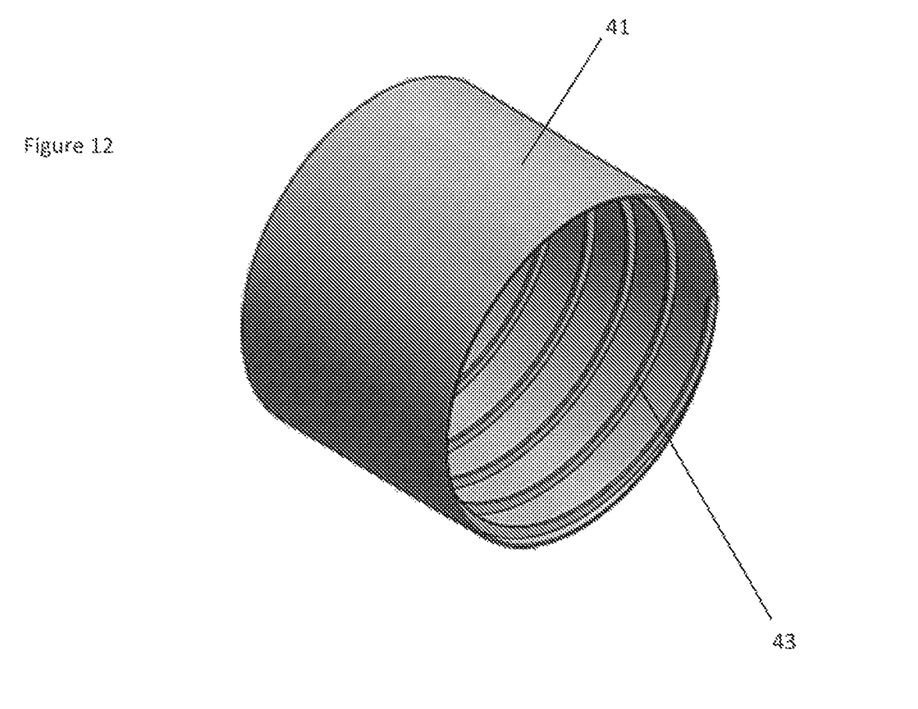
FIG. 12 is a perspective view of a section of the outlet of the assembly.
Figure 13:
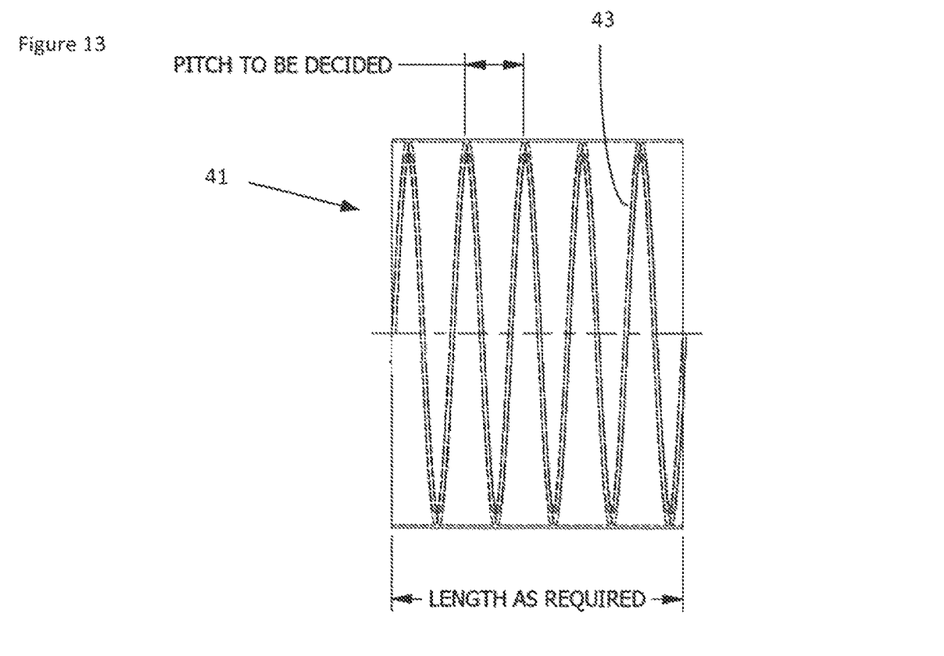
FIG. 13 is a cross section through the outlet section shown in FIG. 12.

The outlet 17 is positioned in a central part of the base 7 of the chamber 5. The outlet 17 includes a flow control valve (not shown) to control the flow of water from the outlet 17. The inlet 15 and the outlet 17 are positioned with respect to each other to describe an angle of approximately 145° when viewed from above the assembly. The outlet includes an outlet funnel section 47 located in the chamber 5 (see FIG. 5). The rotor shaft 19 and the outlet funnel section 47 are located to be co-axial. The outlet funnel section 47 is formed as a shallow funnel, typically having an angle of less than 20°, typically 5-15°, to a horizontal axis to promote the formation of a vortex within the chamber 5 as a stable vortex that does not move around within the chamber 5 after it has been established. The outlet 17 includes an outlet pipe that includes a first section 39 that extends downwardly from the base 7 and a second section 41 that extends perpendicular to the first section 39. As can best be seen in FIGS. 12 and 13, the outlet 17 includes a rifled internal surface, i.e. a surface with a series of spiral ridges 43 in the internal surface, to improve water flow through the outlet 17. The rifled internal surface is one example of a number of options for ensuring that water flow through the outlet 17 and the outlet pipe 39, 41 minimises disruption to the vortex in the chamber 5.

The dimensions of the inlet 15, the outlet 17 and the chamber 5 and the positions of the inlet 15 and the outlet 17 and the rotor 21 are selected to promote the formation of a vortex, i.e. a downwardly spiralling flow of water, within the chamber, preferably with multiple spirals of water down the height of the chamber 5 between the inlet 15 and the outlet 17, when in use the assembly is located in a body of water and there is a flow of water through the chamber from the inlet 15 to the outlet 17. In this regard, relevant factors include but are not limited to (a) providing the side wall 13 with a cylindrical internal surface, (b) the direction of water flow from the inlet 15 into the chamber 5 to promote rotational movement of water within the chamber, (c) positioning the inlet 15 in an upper section of the chamber 5 at a height just above the rotor 21, (d) providing the inlet 15 with a funnel section 37 that maximises water flow into the chamber 5, (e) the shape and location of the vanes 33 of the rotor 21, and (f) providing the outlet 17 with a funnel section 47 that promotes the formation of the vortex as a stable vortex that does not move around within the chamber 5.

The assembly 3 is straightforward to manufacture, transport and install. The chamber and the other components of the assembly can be made from any suitable materials. The assembly is an uncomplicated design that is robust and reliable and requires low maintenance. The assembly 3 is a free-standing unit within a body of water.

In use, the assembly 3 is located in a body of water with the inlet 15 and the outlet 17 submerged in the water and the side wall 13 extending above the water level. Water flows through the chamber 5 from the inlet 15 to the outlet 17 and forms a vortex, preferably with multiple spirals of water down the height of the chamber 5 between the inlet 15 and the outlet 17 that drives the rotor unit and the generator 25 and produces electricity. In a start-up phase of the assembly, with the chamber initially empty and control valves for the inlet and the outlet selectively opened so that the flow of water into the chamber builds up to a point where a vortex forms in the chamber. The vortex is indicated by a conical air space within the chamber that extends downwardly to the outlet, with the water in the chamber flowing in one or multiple spirals of water down the height of the chamber between the inlet and the outlet. Once there is a stable vortex in the chamber, the control valves are adjusted so that the flow rate of water into and out of the chamber is the same.

Many modifications may be made to the embodiment of the invention described above without departing from the spirit and scope of the invention.

By way of example, whilst the embodiment is shown as having particular relative dimensions of the height and the width of the chamber 5, a particular configuration of the rotor 21, and particular configurations of the inlet 15 and the outlet 17 and the other components of the assembly, the present invention is not so limited and extends to any suitable arrangements.

By way of example, whilst the side wall 13 has a cylindrical internal surface to promote the formation of the vortex in the chamber 5, the invention is not limited to this arrangement and the chamber 5 may include formations, such as vanes and/or baffles, to promote the formation of the vortex in the chamber. The formations may be supported by or be part of the side wall and/or the base.

By way of example, whilst the embodiment includes a particular structure that supports the components of the assembly and is adapted to locate the assembly in a body of water, the present invention is not limited to this arrangement. By way of particular example, the series of brackets 29 that extend inwardly from the posts 27 and define a series of supports for the base 7 of the chamber 5 is one of a number of suitable options. Another option is to provide a series of cross-members extending between spaced apart posts 27.

By way of example, whilst the embodiment includes one rotor unit only, the present invention is not limited to this arrangement and may include a plurality of rotor units within one chamber or a plurality of generator units within one chamber, with the assembly being formed to promote the formation of a separate vortex formation associated with each rotor unit.

By way of example, whilst the embodiment is described as being adapted to be located on the bed of a body of water, the present invention is not so limited and extends to embodiments that are adapted to be located on the ground or in the ground beside the body of water. These embodiments include pipe work connecting the body of water to the inlet 15 and the outlet 17 of the assembly 3.

By way of example, whilst the embodiment is described as a stand-alone unit, the present invention is not so limited and extends to arrangements in which the assembly 3 is used in conjunction with other hydro-powered electricity generation systems.

The invention claimed is:

1. An assembly for generating electricity, the assembly including (a) a chamber having a base, a cylindrical side wall extending from the base, a water inlet in the side wall, and a water outlet in the base, with the side wall having a central axis that extends generally vertically when the assembly is in an upright position, and the side wall having a cylindrical internal surface, and with the inlet being at an angle relative to the cylindrical internal surface of the side wall so that in use water flows into the chamber in a generally horizontal direction when the assembly is in the upright position and flows in a spiral pathway within the chamber around a shaft and downwardly to the outlet, (b) a rotor unit having a rotor mounted to the shaft, the rotor being located in and rotatable in the chamber in response to water flow along the spiral pathway through the chamber, with the rotor including a plurality of vanes extending radially outwardly from the shaft towards the side wall, with the vanes being curved vanes that sweep rearwardly from an inner edge that is connected to the shaft and an outer edge, with the inlet and the vanes being positioned relative to each other so that in use at least a part of water flowing into the chamber from the inlet flows directly towards the vanes, (c) an electrical generator or more than one electrical generator coupled to the rotor unit for generating electricity in response to rotation of the rotor, and (d) a support structure including a framework that includes a plurality of support members in the form of legs that, in use of the assembly, extend downwardly from the base and support and locate the chamber, the rotor unit, and the electrical generator or more than one electrical generator of the assembly in or beside a body of water as a free-standing unit, wherein the (i) angle of the inlet, (ii) the dimensions of the inlet, the outlet and the chamber, (iii) the position of the inlet and the position of the outlet, and (iv) the position of the inlet and the position of the vanes relative to each other are configured to promote the formation of a vortex within the chamber when in use and there is a flow of water through the chamber from the inlet to the outlet, wherein the assembly is configured to be transported as a unit from a manufacturing site to an end-use location, and wherein the assembly is configured to be, in use, positioned in the body of water or beside the body of water as a free-standing unit.

2. The assembly defined in claim 1 wherein the chamber includes vanes and/or baffles to promote the formation of the vortex in the chamber.

3. The assembly defined in claim 1 wherein the inlet includes an inlet funnel to maximise the flow of water into the chamber.

4. The assembly defined in claim 1 wherein the outlet is positioned in a central part of the base.

5. The assembly defined in claim 4 wherein the outlet includes an outlet funnel positioned in the chamber.

6. The assembly defined in claim 5 wherein the shape and size of the outlet funnel is a shallow funnel to a horizontal axis when the assembly is in the upright position to promote the formation of the vortex as a stable vortex that does not move around within the chamber after it has been established.

7. The assembly defined in claim 1 wherein the outlet includes an outlet pipe that includes a first section that extends downwardly from the base and a second section that extends perpendicular to the first section.

8. The assembly defined in claim 1 wherein the outlet includes a surface with a series of spiral ridges in the internal surface, to improve water flow through the outlet.

9. The assembly defined in claim 1 wherein the chamber has a maximum width of 30 meters.

10. The assembly defined in claim 1 wherein the chamber has a maximum height of 10 meters.

11. An electricity generation system that includes the assembly defined in claim 1 located in the body of water, with the assembly partially or completely submerged in water, and with water flowing through the chamber and forming the vortex that drives the rotor and the generator and produces electricity.

12. The system defined in claim 11 being adapted to generate 0.1-300 kW of electricity from the assembly.

13. The system defined in claim 11 includes a plurality of the assemblies located in the body of water, with each assembly generating electricity.

14. A method of generating electricity that includes locating the assembly defined in claim 1 in the body of water with the assembly partially or completely submerged in water so that water flows through the chamber and forms the vortex that drives the rotor and the generator and produces electricity.

15. A method of generating electricity that includes locating the assembly defined in claim 1 on the ground or in the ground beside the body of water with the inlet and the outlet in fluid communication with the body of water so that water flows through the chamber from the inlet to the outlet and forms the vortex that drives the rotor and the generator and produces electricity.

16. The system defined in claim 1, wherein the inlet includes a pipe having a straight section with a longitudinal axis that extends generally horizontally when the assembly is in the upright position, the longitudinal axis being spaced from the central axis.

* * * * *